No. 725,780. PATENTED APR. 21, 1903.
P. D. SCHENCK.
BRAKE WHEEL.
APPLICATION FILED NOV. 25, 1902.
NO MODEL.

Witnesses:
F. W. H. Clay
Chas. H. Ebert

Inventor
Peirce D. Schenck
By Paul Synnestvedt
Attorney.

THE NORRIS PETERS CO., PHOTO-LITHO., WASHINGTON, D. C.

UNITED STATES PATENT OFFICE.

PEIRCE D. SCHENCK, OF DAYTON, OHIO.

BRAKE-WHEEL.

SPECIFICATION forming part of Letters Patent No. 725,780, dated April 21, 1903.

Application filed November 25, 1902. Serial No. 132,758. (No model.)

*To all whom it may concern:*

Be it known that I, PEIRCE D. SCHENCK, a citizen of the United States, residing at Dayton, in the State of Ohio, have invented a certain new and useful Brake-Wheel, of which the following is a specification.

My invention relates particularly to means for manipulating brakes and the like by hand; and its principal object is to provide a superior hand-wheel for turning the shaft to operate the brake-moving mechanism. Its object also is to provide an improved design which has certain advantages, as will hereinafter appear.

Figure 1:
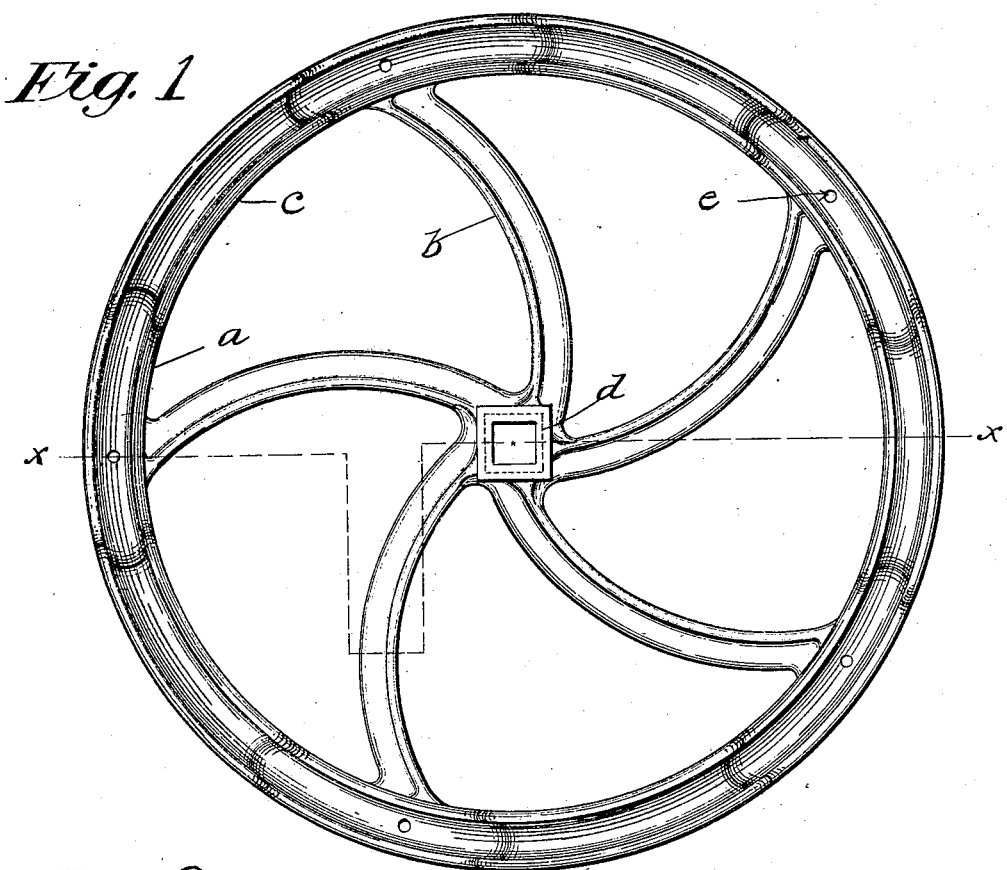
Figure 2:
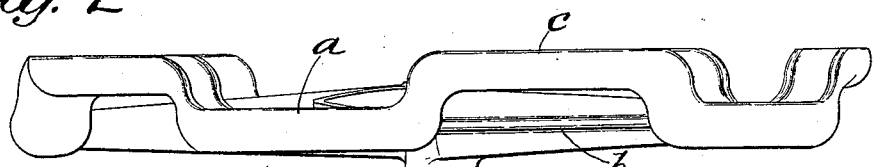
Figure 3:
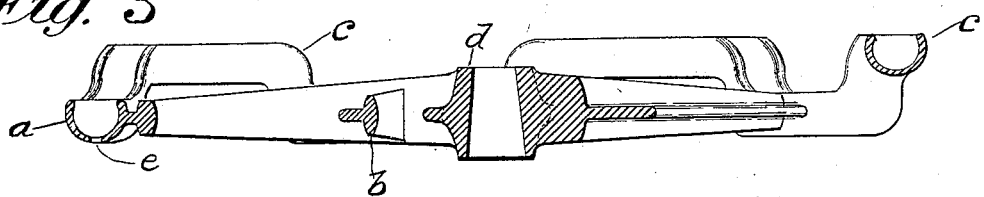

In the accompanying drawings, forming part hereof, Figure 1 is a plan view of my improved brake-wheel. Fig. 2 is a side elevation of the same. Fig. 3 is a cross-section taken along the line $x$ $x$ in Fig. 1.

In manipulating wheels of this character it is important to have some means for grasping them which allows of good purchase and an application of all the operator's power without hurting the hands. It being difficult to grasp the rim itself of a plain wheel several devices, such as vertical handles, have been provided in order to give a positive abutment; but all such projections have the disadvantage of being liable to catch in the clothing. On the other hand, if the spokes of the wheel themselves are relied upon as grasping means it reduces the leverage, and therefore the power which may be applied. I have provided for a vertical abutment and a good hold upon the rim of the wheel itself, which yet is not liable to catch on the clothing, by making the rim of the wheel of the peculiar form shown.

The usual spokes $b$ are provided within the rim $a$, and between the spokes I have made offset or raised portions $c$, which stand above the general plane of the rim. They are curved sharply, as clearly shown in Fig. 2, and I prefer to make the rim and the raised portion $c$ both in the hollow concave form clearly shown in Fig. 3 in order to increase the surface of the handle without introducing an undue weight or waste of material. Generally it is well to provide the small perforations $e$ in the bottoms of the depressed portions in order that water may not collect in this concave rim.

The advantages of this construction will be at once evident to those accustomed to handle such wheels, and among others will appear the ease and convenience of grasping at the very outer periphery of the structure, the comfortable abutment or pulling in either direction, and the convenient form to fit the hand, besides the greater area attained by the peculiar cross-sectional form. However, it is evident that some modifications as to size and form and relative elevation of the raised handles will readily occur to the mechanic.

Having thus described my invention and its use, what I claim, and desire to secure by Letters Patent, is the following:

1. A hand-wheel for brakes comprising a hub and spokes and a rim having raised vertically-offset portions forming convenient handles for grasping and abutments to take the thrust.

2. In a brake-wheel a rim therefor having integral raised or offset grasping portions of rounded concave cross-section, substantially as described.

3. A brake-wheel comprising a hub with spokes and a dished or concave rim having handholds consisting of offset portions of the rim between the spokes.

4. A brake-wheel comprising a rim of concaved cross-section having alternate raised and depressed portions and a perforation for draining, in the depressed portions.

5. A brake-wheel comprising a hub, radiating spokes, a rim of concaved cross-section having integral portions between the spokes raised above the plane of the wheel for convenient grasping, and drain perforations in the depressed portions, substantially as described.

In testimony whereof I have hereunto signed my name in the presence of the two subscribing witnesses.

PEIRCE D. SCHENCK.

Witnesses:
ADOLPH HEINZ,
R. A. HERBRUCK.